United States Patent [19]

Becker et al.

[11] Patent Number: 4,769,048
[45] Date of Patent: Sep. 6, 1988

[54] REGENERATION OF A SCRUBBING AGENT

[75] Inventors: Hans Becker, Munich; Josef Sporer, Wielenbach, both of Fed. Rep. of Germany

[73] Assignee: Linde Aktiengesellschaft, Wiesbaden, Fed. Rep. of Germany

[21] Appl. No.: 82,241

[22] Filed: Aug. 6, 1987

[30] Foreign Application Priority Data

Aug. 7, 1986 [DE] Fed. Rep. of Germany ....... 3626697

[51] Int. Cl.$^4$ ............................................. B01D 53/14
[52] U.S. Cl. ............................................. 55/48; 55/51
[58] Field of Search .................. 55/46, 48, 51, 53, 54, 55/89

[56] References Cited

U.S. PATENT DOCUMENTS 4,670,027 6/1987 Becker et al. .......................... 55/48

Primary Examiner—Charles Hart
Attorney, Agent, or Firm—Millen & White

[57] ABSTRACT

For regeneration of a loaded scrubbing agent, e.g. a polyethylene glycol ether containing $H_2O$ and sour gases, the regeneration is conducted in a regeneration column equipped with a bottom heater and an overhead condenser, by stripping with vapor, e.g. stream provided by the heater vaporizing an aqueous condensate. After condensation of the vapor in the condenser, the stripped components are removed and the remaining condensate is recycled to the bottom part of regeneration column to avoid mixing the aqueous condensate with the loaded solvent. The condensate is fed directly into the bottom of the column or is fed into the line between the column and the bottom heater.

6 Claims, 2 Drawing Sheets

REGENERATION OF A SCRUBBING AGENT

BACKGROUND OF THE INVENTION

This invention relates to an improved process for regeneration of a loaded scrubbing agent in a regeneration column equipped with a bottom heater and an overhead condenser, and in particular to a process comprising utilizing a vapor other than the pure scrubbing agent for stripping purposes. In such processes, stripping vapor is condensed in the condenser, the stripped components are removed and the remaining condensate is recycled to the regeneration column.

In many chemical and physical gaseous absorption processes regeneration is conducted by stripping with a vapor, which, for example, is produced by vaporization of a component contained in the scrubbing agent. In practice, for this purpose water contained in the loaded scrubbing agent is mostly used, but other fluids, such as, for example, methanol or hydrocarbons are also possible. In this case, the regeneration usually is performed in a regeneration column made up of two sections. The lower section is the actual regeneration section, while the upper section is used for rescrubbing of entrained scrubbing agent carried along by the stripping vapor. The loaded scrubbing agent is fed between the two sections, with the vapor necessary for the stripping being produced by heat at the bottom of the column. After condensation of the vapor in the head condenser, the components stripped from the scrubbing agent are removed in the gaseous form. The remaining condensate is fed as reflux to the upper part of the regeneration column and, after passing through this section, is mixed with the loaded scrubbing agent.

A partial stream of the condensate is often removed and used for rescrubbing of the scrubbing agent at the top of the scrubbing column. After passing through this upper section, the condensate also is mixed with the scrubbing agent.

Mixing of the condensate with the scrubbing agent is unsatisfactory inasmuch as the mixture has a higher boiling point than the pure condensate and boils at variable temperatures. It is also disadvantageous that by ad mixing of the condensate, the temperature in the actual regeneration section becomes substantially lower than without the mixing, and as a result the regeneration of the scrubbing agent is made unnecessarily difficult.

SUMMARY OF THE INVENTION

An object of one aspect of this invention is to provide an improved process of the type initially mentioned. According to this aspect of the invention, the condensate is fed into the lower part of the regeneration column, i.e., the bottom zone of the regeneration column and preferably below the actual regeneration section.

Thus, according to the invention, the condensate is conducted around the regeneration section of the regeneration column to avoid the disadvantages of mixing of the condensate with the scrubbing agent, this passage of the condensate being accomplished in a particular manner as described below. In U.S. Pat. No. 4,670,027, issued June 2, 1987, a process is disclosed in which the condensate is likewise not fed back through the regeneration section, but in that proposed process it is absolutely necessary for a substantial part of the condensate, e.g., more than 30%, to be reevaporated in a separate external heat exchanger before being fed into the regeneration column. Conversely, according to the present invention, such evaporation in a separate heat exchanger is not absolutely necessary, as a result of which equipment savings are possible, or the evaporation of a very minor part, e.g., less than 30%, especially less than 20% is sufficient.

According to the basic embodiment of said aspect of the invention, the condensate can be fed in liquid form directly into the bottom zone of the actual regeneration column.

In another more preferable embodiment, it can be done indirectly by adding the condensate to the partial stream removed from the bottom of the regeneration column, a stream which is used for heating the bottom of the column. Preferably the condensate is added upstream of the heat exchanger.

In both embodiments the process includes only a single external heat exchanger for heating a fluid comprising condensate before said fluid is returned to the bottom of the actual regeneration section of the column.

In a third embodiment, a small portion, e.g. less than 30%, especially less than 20% of the condensate is vaporized in a separate heat exchanger thus enjoying the advantage of the low boiling temperature of the pure condensate but putting up with the disadvantage of a separate heat exchanger.

Upon further study of the specification and appended claims, further objects and advantages of this invention will become apparent to those skilled in the art.

It has proved to be especially favorable if at least a part of the condensate, e.g., 20 to 80%, before being fed into the lower area of the regeneration column, is fed as reflux to a section of the regeneration column above the feedpoint of the loaded scrubbing agent and is removed from the column also at a point still above the feedpoint of the loaded scrubbing agent. Thus, in this zone of the regeneration column, entrained scrubbing agent in the gas which leaves the regeneration part of the column, is recovered by the condensate.

Often, a partial stream of the condensate in a similar way is fed to the top of a scrubbing column, to recover entrained scrubbing agent. In this case this partial stream is fed as reflux to a section of the scrubbing column located above the point of entry of the regenerated scrubbing agent and advantageously is again removed above the point of entry of the regenerated scrubbing agent and then fed into the lower area of the regeneration column.

The process according to the invention can be used for regeneration of all appropriate scrubbing agents, for example, in chemical scrubbing processes, using hot potash, monoethanolamine or diethanolamine, or also in physical scrubbing processes with polyethylene glycol ethers or methanol, as well as in hybrid scrubbing processes, as with mixture of alkanolamine and methanol.

BRIEF DESCRIPTION OF THE DRAWINGS.

Further details of the process according to the invention are explained below by the embodiments diagrammatically represented in the figures, wherein.

DETAILED DESCRIPTION OF THE DRAWINGS

Figure 1:
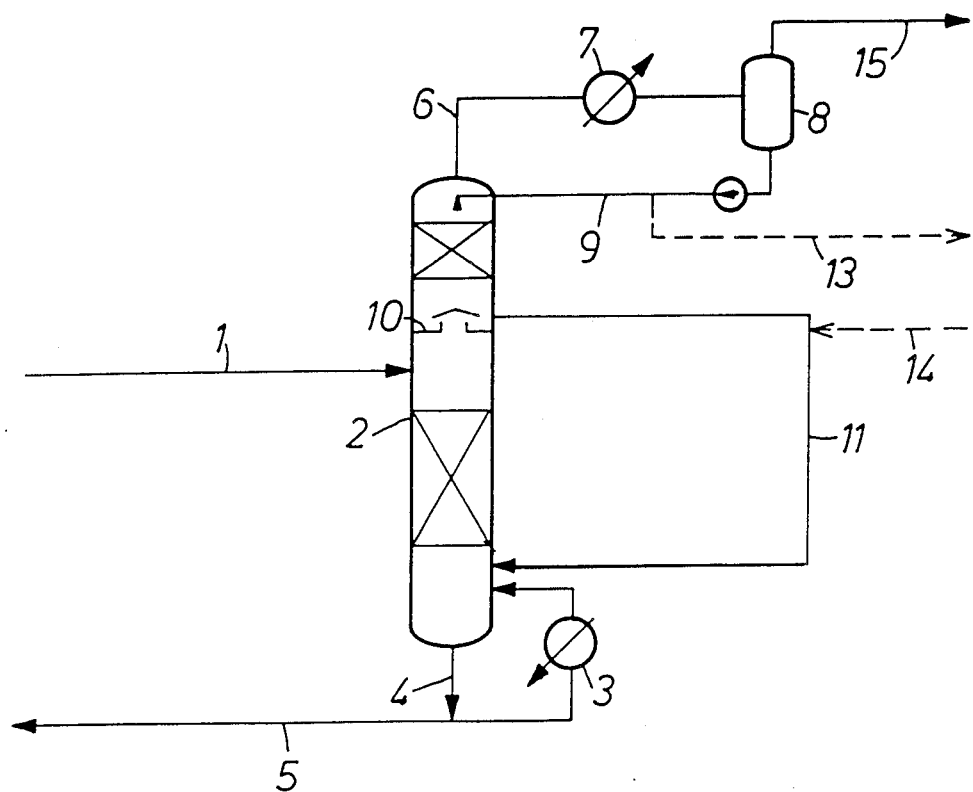
FIG. 1 is a first embodiment of the process according to the invention directed to the recycling of the condensate to the bottom of the column.

According to FIG. 1 loaded scrubbing agent is carried by pipe 1 from a scrubbing process (not shown) and is fed into a middle zone of a regeneration column 2. Column 2 is equipped with a bottom heater 3 and an overhead condenser 7. After regeneration of the scrubbing agent by stripping with vapor rising from the bottom, the scrubbing agent is removed by pipe 4 and partially recycled through the heater 3 to the bottom of the column while the major amount of the regenerated scrubbing agent is removed by pipe 5 and returned to the scrubbing process.

The stripping vapor, which contains the stripped components, leaves column 2 as overhead via conduit 6, is partially condensed in condenser 7 and is fed to phase separator 8. The stripped gas is removed from the separator by conduit 15 and the condensate is removed from the separator by conduit 9 and is fed as reflux to the upper column section.

To avoid mixing of the condensate with scrubbing agent according to the invention, in the upper column section above the point of entry of the loaded scrubbing agent, a tray 10 is installed so that the condensate can be removed by conduit 11 above the tray. It is conducted around the regeneration section of column 2 and fed directly into the lower area of column 2.

As indicated in broken lines, a part of the condensate can be fed from conduit 9 by conduit 13 to the adsorber column for recovery of withdrawn scrubbing agent from the purified gas. This partial stream returned by pipe 14 after recovery of the scrubbing agent, is mixed in conduit 11 with the condensate removed from column 2.

A partial stream of the bottoms 4 of the regeneration column is fed to the reboiler 3 and partially vaporized thus producing the stripping vapor. As only a small portion of the stream has to be vaporized, the liquid/vapor ratio at the exit of the reboiler can easily be adjusted to the requirements of the specific reboiler type.

Figure 2:
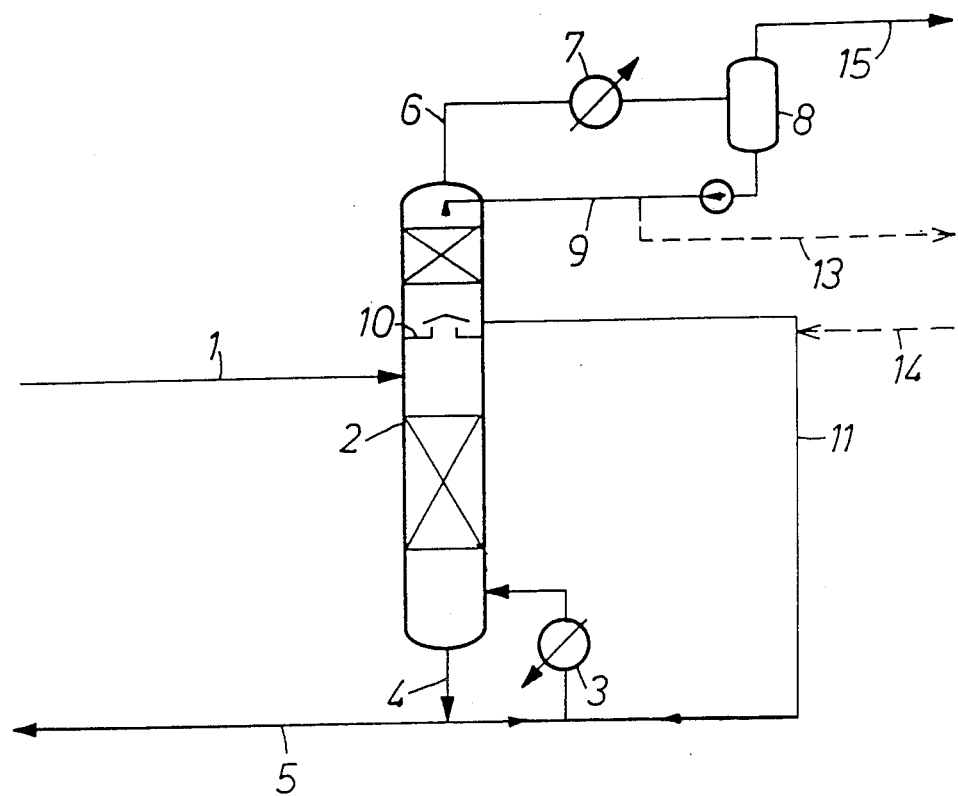
FIG. 2 is another embodiment of the process according to the invention, directed to the recycling of the condensate to a point between the column and bottom heat exchanger.

In the embodiment represented in FIG. 2 the condensate, removed by pipe 11, is not fed directly into the lower area of regeneration column 2, but is fed into the partial stream branched from the bottom product, and the resultant mixture is fed to heat exchanger 3 for bottom heating.

Thus the concentration of the condensate in this stream is higher and consequently the boiling temperature is lower.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLE

In a specific embodiment, 1000 m$^3$/h of tetraethylene glycol dimethyl ether, loaded with $SO_2$ and containing water, are withdrawn from a flue gas scrubbing column and introduced by conduit 1 into the middle of regeneration column 2. The impurities are stripped from the loaded scrubbing agent with about 120 kmol/h of steam. The regenerated scrubbing agent is removed from the bottom by conduits 4 and 5 and returned to the flue gas scrubbing column.

About 145 kmol/h of steam with 25 kmol/h of stripped gases, especially $SO_2$ and $CO_2$, with a temperature of 72° C. and a pressure of 0.45 bar are removed by conduit 6. Most of the steam is condensed in heat exchanger 7 at about 30° C. and fed to separator 8. From the separator the condensed water is removed by pipe 9 and fed as reflux to column 2. At the top of separator 8 about 30 kmol/h of stripped-out gases are removed by conduit 15. About 115 kmol/h of condensate at a temperature of about 76° C. is removed from column 2 above tray 10 and fed by pipe 11 to the lower zone of column 2.

A partial stream of condensate, for example 50 kmol/h, can be removed by conduit 13, fed as reflux to the scrubbing column and returned by conduit 14 where it is again mixed with the condensate in conduit 11 at a temperature of about 25° C.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for regeneration of a loaded scrubbing agent in a regeneration column provided with a bottom heater for reheating regenerated scrubbing agent and an overhead condenser, by stripping with a vapor, in which after condensation of the vapor in said condenser, the stripped components are removed and the remaining stripping vapor condensate is returned to the regeneration column, the improvement comprising feeding the stripping vapor condensate into the bottom zone of the regeneration column without being heated by any heat exchanger other than said bottom heater.

2. A process according to claim 1, wherein the bottom heating of the regenerating column is conducted by indirect heat exchange of a branched off minor part of regenerated bottom product from the regeneration column with a heating medium, and feeding said condensate into the minor part stream branched off from the bottom.

3. A process according to claim 1 wherein at least a part of the condensate, before being fed into the bottom zone of the regeneration column, is fed as reflux to a section of the regeneration column above the feedpoint of the loaded scrubbing agent and is removed at a point above the feedpoint of the loaded scrubbing agent.

4. A process according to claim 2 wherein at least a part of the condensate, before being fed into the bottom zone of the regeneration column, is fed as reflux to a section of the regeneration column above the feedpoint of the loaded scrubbing agent and is removed at a point above the feedpoint of the loaded scrubbing agent.

5. In a process for regeneration of a loaded scrubbing agent in a regeneration column with a bottom heater for reheating regenerated scrubbing agents and an overhead condenser, by stripping with a vapor, in which after condensation of the vapor in said condenser, the stripped components are removed and the remaining stripping vapor condensate is returned to the regeneration column, the improvement comprising feeding the stripping vapor condensate in a completely liquid state into the bottom zone of the regeneration column.

6. A process according to claim 5, wherein at least a part of the condensate, before being fed into the bottom zone of the regeneration column, is fed as reflux to a section of the regeneration column above the feedpoint of the loaded scrubbing agent and is removed at a point above the feedpoint of the loaded scrubbing agent.

* * * * *